(12) United States Patent
Kim et al.

(10) Patent No.: US 7,711,156 B2
(45) Date of Patent: May 4, 2010

(54) APPARATUS AND METHOD FOR GENERATING SHAPE MODEL OF OBJECT AND APPARATUS AND METHOD FOR AUTOMATICALLY SEARCHING FOR FEATURE POINTS OF OBJECT EMPLOYING THE SAME

(75) Inventors: Whoiyul Kim, Seoul (KR); Wonjun Hwang, Seoul (KR); Seokcheol Kee, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1095 days.

(21) Appl. No.: 11/365,688

(22) Filed: Mar. 2, 2006

(65) Prior Publication Data
US 2006/0210168 A1 Sep. 21, 2006

(30) Foreign Application Priority Data
Mar. 2, 2005 (KR) ............... 10-2005-0017216

(51) Int. Cl.
*G06K 9/00* (2006.01)
(52) U.S. Cl. .................. 382/118; 345/419; 382/203; 382/293
(58) Field of Classification Search .......... 345/419, 345/420; 382/100, 115, 118, 187, 203, 293
See application file for complete search history.

(56) References Cited

U.S. PATENT DOCUMENTS

| 6,845,171 | B2* | 1/2005 | Shum et al. ............ 382/100 |
|---|---|---|---|
| 6,975,763 | B2* | 12/2005 | Shiota ................... 382/203 |
| 7,039,216 | B2* | 5/2006 | Shum et al. ............ 382/100 |
| 7,372,981 | B2* | 5/2008 | Lai et al. ............... 382/118 |
| 7,454,039 | B2* | 11/2008 | Tu et al. ................ 382/115 |
| 2004/0041804 | A1* | 3/2004 | Ives et al. .............. 345/419 |
| 2004/0120581 | A1* | 6/2004 | Ozer et al. ............. 382/224 |
| 2006/0210168 | A1* | 9/2006 | Kim et al. ............. 382/203 |

OTHER PUBLICATIONS

Cootes, T. F. et al., "Active Shape Models—Their Training and Application," Computer Vision and Image Understanding, vol. 61, No. 1, pp. 38-59, Jan. 1995.
Hill, A. et al., "Model-Based Image Interpretation Using Genetic Algorithms," Image and Vision Computing, vol. 10, No. 5, pp. 295-300, Jun. 1992.
Lobo, F. et al., "Linkage Learning Genetic Algorithm in C++," IlliGAL Report No. 98006, University of Illinois at Urbana-Champaign, Apr. 1998.

* cited by examiner

*Primary Examiner*—Gregory M Desire

(57) ABSTRACT

An apparatus and method for generating a shape model of an object and an apparatus and method for automatically searching for feature points of an object employing the same. The apparatus for automatically searching for feature points of an object includes: a shape model generation unit which generates a shape model including a mean model of an object, and statistical feature data of each feature point forming a mean shape, by training a plurality of training sets in which a plurality of feature points are labeled for the object; an initial position resetting unit which resets an initial position of each feature point of the mean shape according to a pose of an input image; and a feature point extraction unit which adapts the mean shape whose initial position is reset, to the input image, by using the statistical feature data of each feature point of the mean shape, and extracts feature points of the input image.

19 Claims, 5 Drawing Sheets

APPARATUS AND METHOD FOR GENERATING SHAPE MODEL OF OBJECT AND APPARATUS AND METHOD FOR AUTOMATICALLY SEARCHING FOR FEATURE POINTS OF OBJECT EMPLOYING THE SAME

CROSS-REFERENCE TO RELATED APPLICATIONS

This application claims the benefit of Korean Patent Application No. 10-2005-0017216, filed on Mar. 2, 2005, in the Korean Intellectual Property Office, the disclosure of which is incorporated herein in its entirety by reference.

BACKGROUND OF THE INVENTION

1. Field of the Invention

The present invention relates to an apparatus and method for automatically searching for feature points of an object, and more particularly, to an apparatus and method for accurately searching for feature points of an object in an image in which the pose of the object changes greatly.

2. Description of the Related Art

An active shape model (ASM) is an analytical model capable of extracting the shape of an object included in a new image, by using a statistical shape model after generating the statistical shape model of the object to search for by using training sets given in advance. Here, each training set consists of face images on which feature points of an object to search for are labeled, and the shape in each training set is a set of n labeled landmarks, that is, n feature points. In the ASM, correlation with which feature points labeled differently to each other move is modeled, as the shape of an object changes. Each of labeled feature points can be made to be one vector, and by performing a principal component analysis for all vectors generated in relation to the training sets, the shape can be described using an appropriate number of coefficients. According to the ASM, a statistical shape model can be iteratively changed to match an object in a new image. The shape change in the statistical shape model of ASM is restricted, so that the shape change is made only in the direction shown in labeled training sets.

However, in the ASM which is currently used for searching for feature points of a face image, the positions of feature points of an average face image obtained from training sets formed with a plurality of front face images are used. Accordingly, when the pose of the face in the input image changes greatly, it is difficult to correctly search for feature points, for example, because the positions of feature points are diffused. In addition, since an ASM profile formed with 1-dimensional templates is used in order to determine the positions to which feature points will move in a face image, there is a possibility that the ASM falls into a local minimum, in particular pose variation.

An article related to and generally discussing ASM was written by T. F. Cootes, C. J. Taylor, D. H. Cooper, and J. Graham entitled "Active Shape Models-Their Training and Application", Department of Medical Biophysics, University of Manchester, Oxford Road, Manchester M13 9PT. England, Computer Vision and Image Understanding Vol. 61, No. 1, pp. 38-59, January 1995.

BRIEF SUMMARY

An aspect of the present invention provides an apparatus and method for generating a shape model of an object having statistical feature data for an image structure in the vicinity of feature points, which is obtained from a 2-dimensional template of each feature point included in a mean shape of the object.

An aspect of the present invention also provides an apparatus and method for accurately search for feature points of an image in which the pose changes greatly, by using the shape model of the object.

According to an aspect of the present invention, there is provided an apparatus for generating a shape model of an object, including: a training database which stores a plurality of training sets in which a plurality of feature points are labeled for an object; a mean shape generation unit which generates the mean shape of the plurality of training sets; and a statistical feature data generation unit which generates statistical feature data for the image structure in the vicinity of the feature point, using a 2-dimensional main template of each feature point forming the mean shape.

According to another aspect of the present invention, there is provided a method of generating a shape model of an object, including: providing a training database which stores a plurality of training sets in which a plurality of feature points are labeled for an object; generating a mean shape of the plurality of training sets; and generating statistical feature data for the image structure in the vicinity of the feature point, using a 2-dimensional main template of each feature point of the mean shape.

According to still another aspect of the present invention, there is provided a an apparatus for searching for feature points of an object, including: a shape model generation unit which generates a shape model including a mean model of an object, and statistical feature data of each feature point forming the mean shape, by training a plurality of training sets in which a plurality of feature points are labeled for the object; an initial position resetting unit which resets the initial position of each feature point of the mean shape according to the pose of an input image; and a feature point extraction unit which adapts the mean shape whose initial position is reset, to the input image by using the statistical feature data of each feature point of the mean shape, and extracting feature points of the input image.

According to yet still another aspect of the present invention, there is provided a method of searching for feature points of an object, including: generating a shape model including a mean model of an object, and statistical feature data of each feature point forming the mean shape, by training a plurality of training sets in which a plurality of feature points are labeled for the object; resetting the initial position of each feature point of the mean shape according to the pose of an input image; and adapting the mean shape whose initial position is reset, to the input image by using the statistical feature data of each feature point of the mean shape, and extracting feature points of the input image.

According to a further aspect of the present invention, there are provided computer readable recording media having embodied thereon a computer programs for executing the method of generating a shape model of an object, and the method of automatically searching for feature points of an object.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
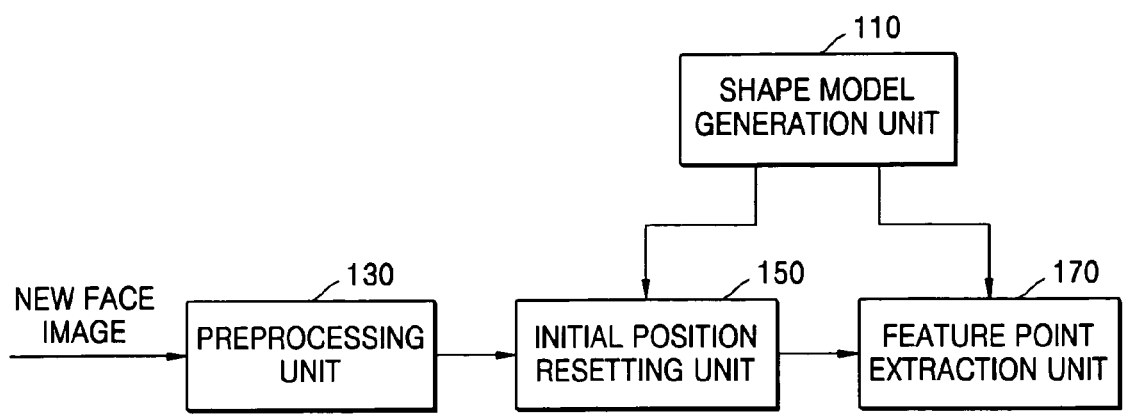
FIG. 1 is a block diagram of the structure of an apparatus for automatically searching for feature points of an object according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

First, the basic principle of an active shape model (ASM) algorithm applicable to embodiments of the present invention will be explained.

The feature points (that is, landmarks) of a face image used as a training set can be expressed as the following table 1, but are not limited thereto:

TABLE 1

| Feature | Number of Landmarks |
|---|---|
| Face contour | 15 |
| Each eyebrow | 8 |
| Each eye | 8 |
| Nose | 7 |
| Mouth | 22 |
| Total | 76 |

The shape in each training set is a set of n (here, 76) labeled feature points, and can be expressed as the following equation 1:

$$X=(x_0, y_0, x_1, y_1, \ldots, x_k, y_k, \ldots, x_{n-1}, y_{n-1})^T \quad (1).$$

The feature points of respective face images are arranged in different local coordinate systems, according to the characteristics of an input face image. That is, according to the conditions when photographing the face, each face image has a different size (scale (s)), a different rotation degree (direction ($\theta$)), and a different position of the center point (translation ($t_x$, $t_y$)). Accordingly, while keeping the shape characteristics of the face, feature point data extracted from this face image needs to be aligned approximately in a common reference coordinate system. An alignment algorithm can be expressed as the following equation 2:

$$x = T_{t_x,t_y,s,\theta}(x) \quad (2).$$

Here, function $T_{t_x,t_y,s,\theta}(x)$ performs rotation by $\theta$, scaling by s, and translation by ($t_x$, $t_y$). For example, if a single feature point (x, y) is given, it can be expressed as the following equation 3:

$$T_{t_x,t_y,s,\theta}\begin{pmatrix} x \\ y \end{pmatrix} = \begin{pmatrix} t_x \\ t_y \end{pmatrix} + \begin{pmatrix} s\cos\theta & -s\sin\theta \\ s\sin\theta & s\cos\theta \end{pmatrix}\begin{pmatrix} x \\ y \end{pmatrix}. \quad (3)$$

Meanwhile, $\bar{x}$ is the mean shape of N aligned training sets and can be expressed as the following equation 4:

$$\bar{x} = \frac{1}{N}\sum_{i=1}^{N}(x_i). \quad (4)$$

The deviation ($dx_i$) between the shape of each training set and the mean shape can be expressed as the following equation 5:

$$dx_i = x_i - \bar{x} \quad (5).$$

Here, the covariance matrix (S) can be expressed as the following equation 6:

$$S = \frac{1}{N}\sum_{i=1}^{N}dx_i dx_i^T. \quad (6)$$

Eigen vectors $p_k$ (here, k=1, ..., 2n) of the covariance matrix (S) are obtained by eigen value analysis of the following equation 7:

$$Sp_k = \lambda_k p_k \quad (7).$$

Here, $\lambda k$ denotes the k-th eigen value of the covariance matrix (S) and satisfies $\lambda k \geq \lambda k+1$.

Then, by aligning eigen vectors having respective eigen values in descending order, the eigen vector matrix P can be expressed as the following equation 8:

$$P = [p_1, \ldots, p_{2n}] \quad (8).$$

Accordingly, by deforming the mean shape ($\bar{x}$) of training sets using the product of the eigen vector matrix (P) obtained using the covariance matrix (S) and weight vector (b), an arbitrary shape x can be expressed as the following equation 9:

$$x = \bar{x} + Pb \quad (9).$$

Since the variation expressed by each eigen vector is the same as the corresponding eigen value, most changes in a shape can be expressed by using t (here, t<2n) eigen vectors having large eigen values. If the value t is large, the variation of the shape can be expressed in detail, while if the value t is small, the variation cannot be expressed in detail. Here, the value t may be selected to be equal to or greater than 98% of the entire variation, according to the following expression 10:

$$\sum_{i=1}^{t} \lambda_i \geq 0.98 \sum_{i=1}^{2n} \lambda_i. \qquad (10)$$

By using the selected value t, equation 9 can be approximated by the following equation 11:

$$x \approx \bar{x} + P_t b_t \qquad (11).$$

Here, $P_t=(p_1, p_2, \ldots, p_t)$ is the matrix of the first t eigen vectors, and $b_t=(b_1, b_2, \ldots, b_t)^T$ is a shape parameter vector. Since $P_t$ is a matrix of eigen vectors and the inverse matrix of $P_t$ is the same as the transposed matrix of $P_t$, $b_t$ can be obtained by the following equation 12:

$$b_t = P_t^T (x - \bar{x}) \qquad (12).$$

If the shape parameter ($b_k$) is changed within an appropriate range, it is possible to express new shapes similar to the training set. In order to maintain the shape similar to a statistical shape model, the range of the shape parameter ($b_k$) can be restricted, generally as described by the following expression 13:

$$-3\sqrt{\lambda_k} \leq b_k \leq 3\sqrt{\lambda_k} \qquad (13).$$

When a shape parameter ($b_k$) having a value outside this range is used to form a shape, the resulting shape may be different from the desired one.

Meanwhile, a process for moving the coordinates of feature points, from the feature points belonging to the mean shape ($\bar{x}$) of aligned training sets toward the feature points of an input face image, will now be explained.

First, image pixel information in the vicinity of coordinate values of each feature point belonging to the mean shape ($\bar{x}$) is searched for, in order to find the coordinates of the location to which the feature point is to move.

Second, by using an intermediate shape ($x_{int}$) formed with new coordinate values found in relation to all feature points, the shape parameter (b) is updated as in equation 12.

Third, the first and second processes are repeated until convergence is achieved.

For the first process for finding out the coordinate values of the location to which the feature point is to move, a statistical model for the image structure in the vicinity of each feature point belonging to the mean shape ($\bar{x}$) is first established, and during searching, the pixel which most closely matches the statistical model is determined as the location to which the feature point moves.

In order to establish the statistical model for each feature point, in relation to each feature point belonging to the mean shape ($\bar{x}$), k pixels in both sides of the feature point belonging to an (i-th) training set are sampled to generate a 1-dimensional profile. One vector $g_i$ includes (2k+1) pixels. In order to reduce the influence of changes in global intensity, in the 1-dimensional profile, the difference between the gray levels of adjacent pixels is sampled, not the absolute values of the gray level of a pixel. Then, each vector $g_i$ is normalized by the following expression 14:

$$g_i \rightarrow \frac{1}{\sum_j |g_{ij}|} g_i. \qquad (14)$$

Here, $g_{ij}$ denotes each pixel forming vector $g_i$.

The normalization process as described above is performed iteratively on all N training sets, and a normalized 1-dimensional profile $\{g_i\}$ of the feature points given in the mean shape ($\bar{x}$) is obtained. Assuming that the normalized 1-dimensional profile $\{g_i\}$ has a multi-variate Gaussian distribution, the mean ($\bar{g}$) and covariance ($S_g$) are estimated. The estimated mean ($\bar{g}$) and covariance ($S_g$) are provided as statistical feature data of a gray level profile for a given feature point in the mean shape ($\bar{x}$).

By performing the process as described above for all feature points of the mean shape ($\bar{x}$), the mean ($\bar{g}$) and covariance ($S_g$) of each feature point are obtained and determined as the statistical feature data for the feature point.

Whether or not a new sample $g_s$ obtained on the 1-dimensional profile of a given feature point matches to the statistical feature data of the feature point can be determined by the following equation 15:

$$f(g_s) = (g_s - \bar{g})^T S_g^{-1} (g_s - \bar{g}) \qquad (15).$$

Here, function $f(g_s)$ denotes the Mahalanobis distance between sample $g_s$ and the mean ($\bar{g}$), and if this value is small, it indicates a high probability that the new sample $g_s$ appears from the statistical feature data distribution of the corresponding feature point.

During the search process, m (here, m>k) pixels on both sides of a feature point moved on the 1-dimensional profile are sampled. For all [2(m−k)+1] samples $g_s$ that can be obtained from among (2m+1) pixels, by using the function f(gs) defined in the equation 15, the location of the feature point is moved to sample $g_s$ having the smallest value.

By performing the process described above iteratively for all feature points of the mean shape ($\bar{x}$), the new location for each feature point is determined.

After that, at the newly determined location of the feature point, the shape parameter (b) for matching the mean shape ($\bar{x}$) is updated. That is, a new location is determined for each feature point, and is expressed as vector x, and then by using equation 12, the shape parameter (b) corresponding to the current vector x is obtained. Then, the shape parameter (b) is adjusted according to whether the each element of the shape parameter (b) satisfies constraints of the shape model, for example, the condition of equation 13. For example, if the absolute value $|b_1|$ of element $b_1$ of the shape parameter (b) is greater than $|k\sqrt{\lambda_1}|$, then $b_1$ is set to an arbitrary value between $-k\sqrt{\lambda_1}$ and $k\sqrt{\lambda_1}$. This setting process allows feature points to change while maintaining a shape at least similar to the mean shape, even though the feature points move to new locations.

Meanwhile, in order to increase the efficiency and reduce the iteration frequency in the search process in the ASM algorithm, a multi-resolution ASM which is updated from a lower resolution image to a higher resolution image is used. That is, if an image pyramid having a variety of resolutions is applied to level L (L=$L_{max}, L_{max-1}, \ldots, 2, 1, 0$), even though identical (2k+1) pixel information items are searched for at each level, the search area is expanded $2^L$ times compared to that of the original image, and the searching efficiency increases with a greater translation width. At this time, the condition that the current level resolution is switched to one resolution level lower is determined by obtaining the number of feature points moving within 50% of the 1-dimensional profile when the locations of newly found feature points are compared with the locations of current feature points.

FIG. 1 is a block diagram of the structure of an apparatus for automatically searching for feature points of an object according to an embodiment of the present invention. The apparatus includes a statistical shape model generation unit 110, a preprocessing unit 130, an initial position resetting unit 150, and a feature point extraction unit 170.

Referring to FIG. 1, from a plurality of training sets collected in the training database (210 of FIG. 2), the shape model generation unit 110 generates a shape model of an object from which feature points are to be extracted. At this time, a plurality of feature points are labeled in each training set. The shape model of the object has the mean shape of the plurality of training sets, and includes the statistical feature data for the image structure in the vicinity of each feature point of the mean shape. In the present embodiment, when the statistical feature data for the image structure in the vicinity of each feature point is generated, a 2-dimensional template, instead of a 1-dimensional profile, is used as a profile for the feature point, to greatly reduce the possibility of falling into a local minimum in which the minimum value of the function $f(g_s)$ obtained by the equation 15 is found at an irrelevant location. That is, since the amount of information used is greater than for the 1-dimensional profile, the probability of error is reduced.

The preprocessing unit 130 performs a preprocessing process by which the position of eyes in the input face image is detected and the size of the face image is normalized.

The initial position resetting unit 150 uses the statistical feature data of each feature point generated in the shape model generation unit 110, and according to the pose of the input face image, adaptively resets the initial position of the feature points of the shape model loaded from the shape model generation unit 110.

When the feature point of the input face image is extracted, the initial position of the feature points of the shape model corresponding to each element of the face is very important. Since the feature points of the shape model loaded from the shape model generation unit 110 are obtained from the mean image of a plurality of frontal face images collected from the training database, if the input face image has a large pose change, it is difficult to guarantee the ASM adaptation performance. Accordingly, before the ASM adaptation process is performed, the initial position resetting unit 150 resets the initial position of the feature points of the shape model to be loaded on the preprocessed face image. According to this, with a lower frequency of the adaptation processes, the feature points can be extracted accurately from the input face image.

The feature point extraction unit 170 adapts the loaded shape model to the input face image by using the statistical feature data of the feature point belonging to the shape model obtained beforehand, extracts the feature points of each element of the input face image, and outputs the coordinates (x, y) of the extracted feature points. Here, the shape model adaptation involves finding the feature points of the eyebrows, eyes, nose, mouth and facial contour of the input face image by iteratively performing a process in which the feature points of the shape model loaded on the input face image are connected by straight lines, the pixels in the normal direction to the straight lines on the feature point of each shape model are searched for, and the pixel having the highest correlation with the value learned in the training set in the corresponding profile is updated as a new feature point. This shape model adaptation process is the same as the basic principle of the ASM algorithm described above.

In the present embodiment, the ordinary shape model adaptation process is applied without change, and the 2-dimensional template instead of the 1-dimensional profile is used to greatly reduce the possibility of falling into a local minimum in which the minimum value of the function $f(g_s)$ obtained by the equation 15 is found at an irrelevant location.

Meanwhile, in order to solve the problem that feature points at irrelevant locations can be extracted because of too wide a search area, it is possible to perform the shape model adaptation with the searching area of each feature point of the shape model being restricted in advance. For example, in the case of the eyes, the search area for the feature points above the eyes may be restricted to within half the distance to the eyebrows, and the search area for the feature points below the eyes may be restricted to half the width between the upper eyelid and the lower eyelid. In the case of the nose, the search area for feature points corresponding to the nostrils and nose tip may be restricted to within half the distance from the nose to the upper lip, and in case of the lips, the search area for the feature points above the lips may be restricted to within half the distance from the lips to the nose tip, and the search area for the feature points below the lips may be restricted to within one third the width of the upper and lower lips.

Figure 2:
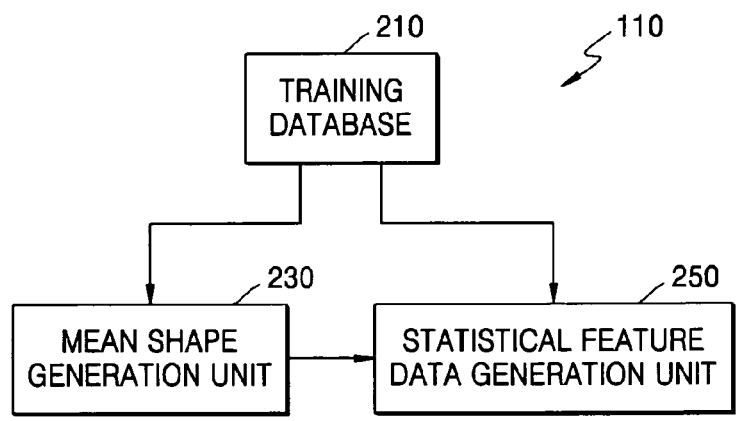
FIG. 2 is a block diagram of a shape model generation unit in FIG. 1.

FIG. 2 is a block diagram of the shape model generation unit 110 in FIG. 1. The shape model generation unit 110 includes a training database 210, a mean shape generation unit 230, and a statistical feature data generation unit 250.

Figure 3:
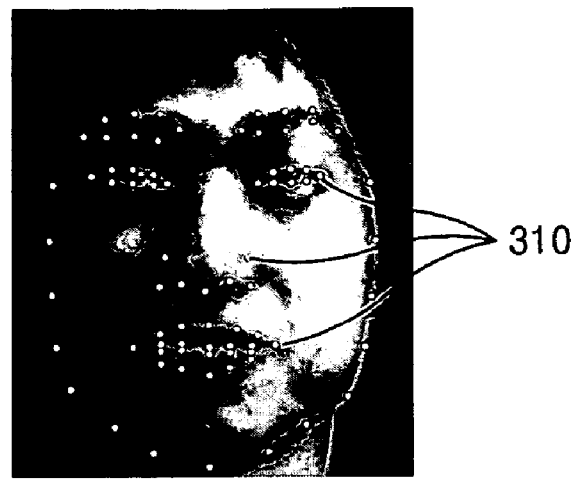
FIG. 3 illustrates the distribution of landmarks labeled in a training set stored in a training database in FIG. 2.

Referring to FIG. 2, the training database 210 stores a plurality of training sets in which a plurality of feature points 310 are labeled as shown in FIG. 3. Here, the number of feature points is set to, for example, 76.

The mean shape generation unit 230 takes the mean of (x, y) coordinate values of each feature point of all the training sets stored in the training database 210, and generates a mean shape having feature points located at the averaged coordinate values.

Figure 4:
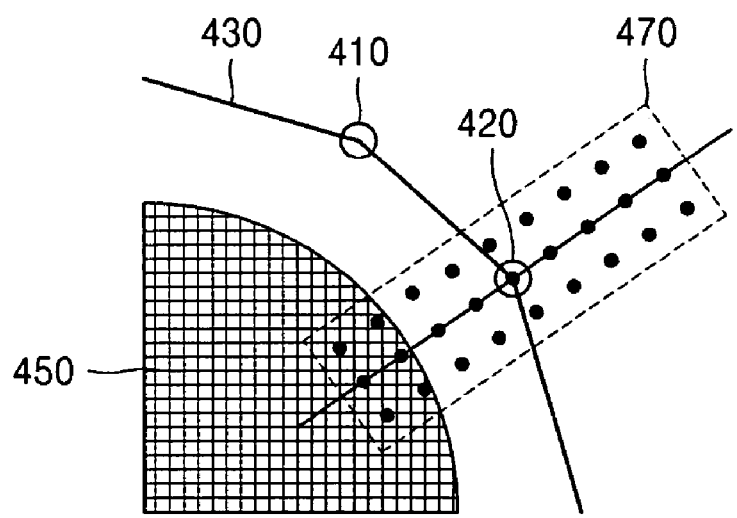
FIG. 4 illustrates an example of a 2-dimensional template used in a statistical feature data generation unit in FIG. 2.
Figure 5:
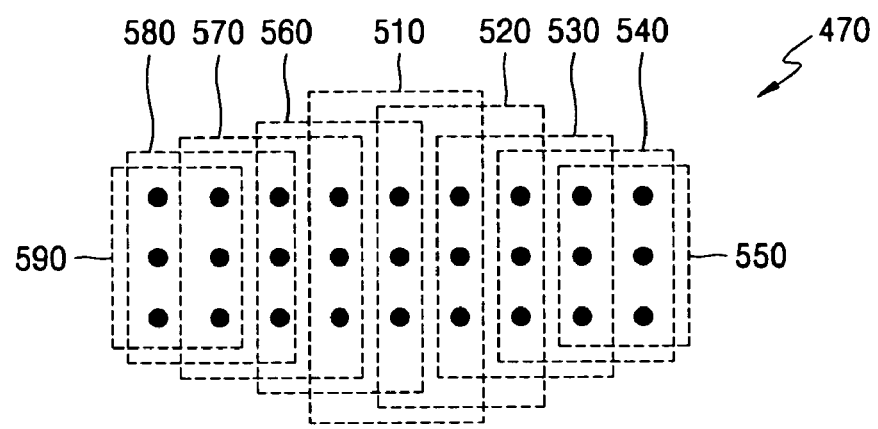
FIG. 5 illustrates an example of a first sub template used when statistical feature data is generated in a 2-dimensional main template.

For each feature point of the mean shape generated in the mean shape generation unit 230, the statistical feature data generation unit 250 generates the statistical feature data for the image structure in the vicinity of the feature point. Here, an example of setting a main template 470 with a size of m×n (for example, m=3, n=9), as shown in FIG. 4, as the entire search range for an arbitrary feature point will now be explained. Referring to FIG. 4, a boundary 430 of the mean shape is generated by connecting each feature point 410 and 420 of the mean shape with straight lines. Then, the main template 470 is formed with pixels obtained from both sides of the arbitrary feature point 420 in the normal direction to the image structure 450 from the feature point 420. Next, the gray level mean and gray level covariance of a plurality (here, 9) of first sub templates 510 through 590 shown in FIG. 5 that can be obtained on the main template 470 are calculated. Each sub template has a size of m×o (o<n, for example, $2 \leq o \leq 3$). This process for calculating the gray level mean and gray level covariance of the first sub templates is performed for all training sets stored in the training database 210 of FIG. 2, so that the statistical feature data for the image structure in the vicinity of each feature point can be provided. That is, the first sub templates indicate a search unit, for example, with a size of 3×3 on an arbitrary feature point used for generating the statistical feature data of the feature point in the main template with a size of 3×9 that is the entire search range.

Figure 6:
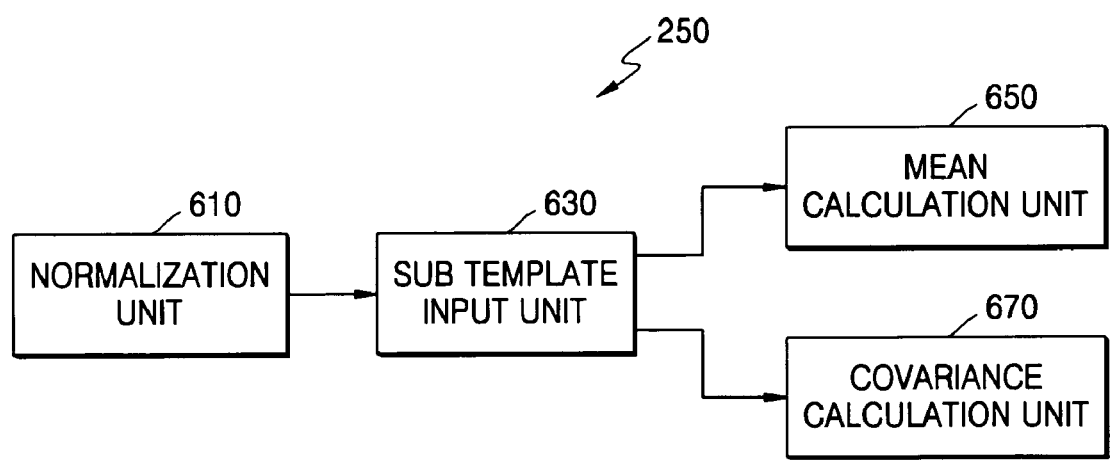
FIG. 6 is a detailed block diagram of a statistical feature data generation unit in FIG. 2.

FIG. 6 is a detailed block diagram of the statistical feature data generation unit 250 in FIG. 2. The statistical feature data generation unit 250 includes a normalization unit 610, a sub template input unit 630, a mean calculation unit 650, and a covariance calculation unit 670.

Referring to FIG. 6, in order to fully reflect the characteristics of the set facial area, that is, the average characteristics of all face images in the training set, the normalization unit 610 reflects the gray level mean of the set facial area so that the gray levels of all pixels included in the m×n, for example, 3×9 main template for each feature point are normalized.

The normalization process for the gray level values of pixels included in each main template can be performed as shown by the following equation 16:

$$m_i = \frac{1}{N}\sum_{j=1}^{N} t_{ij}$$

$$\sigma_i^2 = \frac{1}{N}\sum_{j=1}^{N}(t_{ij} - m_i)^2$$

$$t_{ij} \rightarrow \frac{t_{ij} - m_i}{\sigma} \times 128 + 128 + n - m_i.$$

(16)

Figure 7:
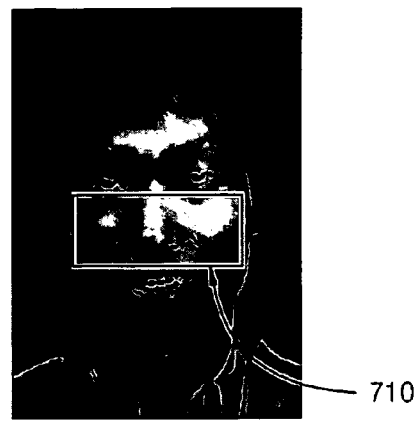
FIG. 7 illustrates the location of a face area used during normalization.

Here, $m_i$ denotes the gray level mean of pixels ($t_{ij}$) belonging to the main template obtained from an i-th feature point, $\sigma_i^2$ denotes the variance between each pixel ($t_{ij}$) and a mean ($m_i$), and N denotes the number of samples belonging to the main template. n denotes the gray level mean of the facial area 710, as shown in FIG. 7, in order to reflect all characteristics of a face image.

According to this, the characteristics of the facial area can be sufficiently reflected in the vector ($g_i$) formed by using the m×n main template.

For the landmark at the location corresponding to each feature point of the mean shape obtained from the all training sets, the sub-template input unit 630 inputs a plurality of first sub templates obtained from the main template that is the search range.

By using the plurality of first sub-templates input for each feature point, the mean calculation unit 650 calculates the template mean that is first statistical feature data for each feature point.

By using the plurality of first sub-templates input for each feature point, the covariance calculation unit 670 calculates the template covariance that is second statistical feature data for each feature point.

Figure 8:
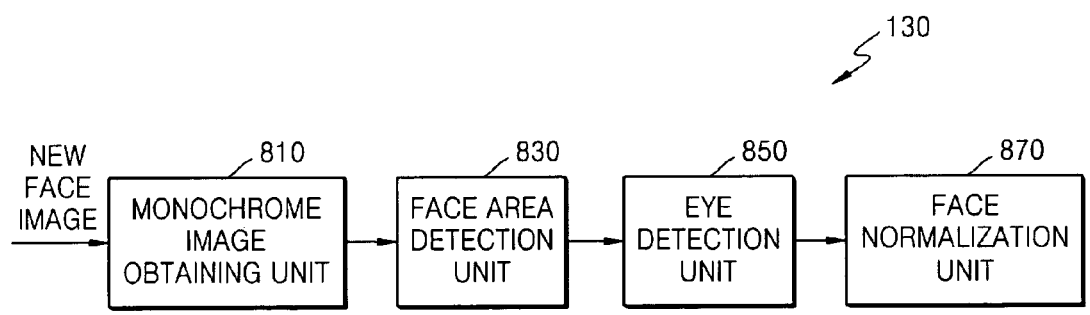
FIG. 8 is a detailed block diagram of the structure of a preprocessing unit in FIG. 1.

FIG. 8 is a detailed block diagram of the structure of the preprocessing unit 130 in FIG. 1. The preprocessing unit includes a monochrome image obtaining unit 810, a face area detection unit 830, an eye detection unit 850, and a face normalization unit 870.

Referring to FIG. 8, if the input face image is a color image, the monochrome image obtaining unit 810 converts the input face image into a monochrome image. This prevents errors caused by brightness change when a feature point is extracted, since a luminance component is included together with a chrominance component in an RGB-type color image.

By applying a Gabor filter to the input face image, the face area detection unit 830 detects the face area. Here, in the face area detection method using the Gabor filter, a set of Gabor filters having a variety of directivities and frequencies is applied to the input face image, and according to response values, a face area is detected. Since the method is a preprocessing process generally used in the image processing field, a detailed explanation will be omitted.

The eye detection unit 850 detects the central points of the two eyes, each point that is located on the top of the face area and has a circular black part surrounded by a white part, that is, the pupils, in the face area detected by the face area detection unit 830. Here, the reason why the central points of the two eyes are first detected is that it is easiest to detect the central points of the two symmetrical eyes, and if the locations of the central points of the two eyes are determined, the locations of other elements of the face can be easily detected by using appropriate proportional relationships. Here, a variety of methods including an edge detection method and a binarization method can be used. In the edge detection method, the edge of an eye is detected and used to detect the central point of the two eyes. In the binarization method, a monochrome face image having 256 brightness levels is divided into black and white with a threshold value as a reference, and by using the fact that the central points of the two eyes are black, black circular areas are detected as the central point of the two eyes. When the binarization method is applied, the binarization can be performed by changing the threshold value appropriately according to the state of the face image, and increasing the threshold value until both the eyebrows and eyes become black in predetermined areas.

The face normalization unit 870 normalizes the size of the face area based on the location of the eyes detected by the eye detection unit 850.

Figure 9:
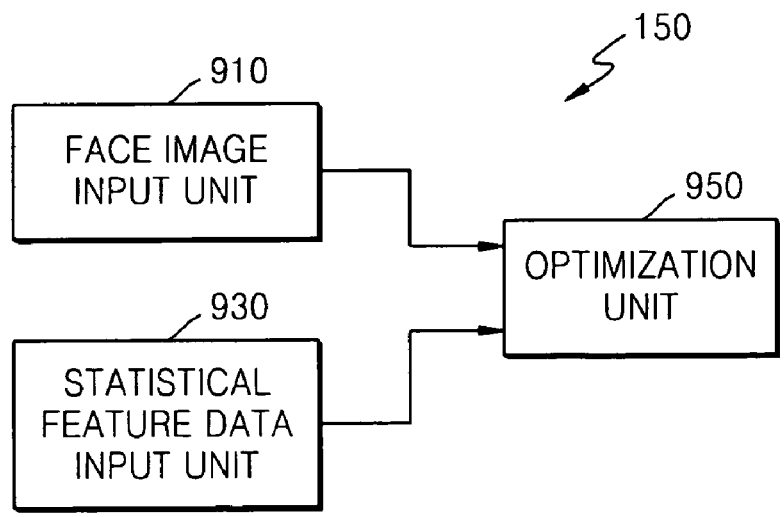
FIG. 9 is a detailed block diagram of an initial position resetting unit in FIG. 1.

FIG. 9 is a detailed block diagram of the initial position resetting unit 150 in FIG. 1. The initial position resetting unit 150 includes a face image input unit 910, a statistical feature data input unit 930, and an optimization unit 950.

Referring to FIG. 9, the face image input unit 910 inputs the face image preprocessed by the preprocessing unit 130 of FIG. 1.

The statistical feature data input unit 930 inputs the gray level mean and gray level covariance of the main template that is the statistical feature data for the feature point of a mean shape provided by the shape model generation unit 110 of FIG. 1.

By using the gray level mean and gray level covariance of the main template for each feature point, the optimization unit 950 adaptively optimizes the initial position of each feature point of the mean shape, to the pose of the face image input from the face image input unit 910, and sets a new initial position for each feature point.

Here, in order to adaptively reset the initial position of each feature point of the mean shape according to the pose of the new image, a variety of optimization techniques can be used, including a genetic algorithm. In addition, a global optimization technique such as a simulated annealing technique, and a local optimization technique such as Powell's method or Simplex, can also be used.

The process for resetting an initial position in the optimization unit 950 using the genetic algorithm will now be explained.

First, for example, 120 vectors are randomly generated, each vector formed with 76 (x, y) coordinate pairs indicating feature points. Vector (x) formed with one feature point group can be expressed by the following equation 17:

$$X = (x_0, y_0, x_1, y_1, \ldots, x_{75}, y_{75})^T \qquad (17).$$

After setting the value t to 4, for example, the shape parameter ($b_k$) is obtained so that the range of the shape parameter ($b_k$) defined in equation 13 can be satisfied. Using 4 shape parameters ($b_1, b_2, b_3, b_4$), 120 vectors (x) are obtained based on equation 11. This will now be explained in more detail.

First, in operation 1, 120 chromosomes each with a length of 16 bits are randomly generated. For example, chromosome 1, chromosome 2, and chromosome 120 can be respectively generated as '1001 0011 0101 1110', '0101 1011 1101 1111', and '0100 0011 0001 0000'.

In operation 2, one coefficient is generated for each 4 bits. For example, when the 4 bits are '1001', the process for determining the coefficient is shown by the following equation 18:

$$\mathrm{int}_{co} = 1*2^3 + 0*2^2 + 0*2^1 + 1*2^0 \text{ coefficient value} =$$
$$\mathrm{int}_{co} *2.0/\mathrm{COEF}_{VAR\text{-}STEP}*\mathrm{COEF}_{VAR\text{-}SCALE}*$$
$$\sqrt{|\lambda_i|} - \mathrm{COEF}_{VAR\text{-}SCALE}*\sqrt{|\lambda_i|} \qquad (18)$$

Here, $COEF_{VAR-SCALE}$ is 3, and $COEF_{VAR-STEP}$ is 15. $int_{co}$ has a value between the minimum and maximum values of 0(0000) and 15(1111). Accordingly, $int_{co}*2.0/COEF_{VAR-STEP}$ has a value between 0 and 2, and if these coefficient values are obtained, each coefficient value satisfies the constraints defined in the equation 13.

In operation 3, this method is used to obtain 4 coefficient values by using one chromosome with a length of 16 bits. For example, if chromosome 1 is '1001 0011 0101 1110', then coefficients 1 through 4 are obtained from '1001', '0011', '0101', and '1110', respectively.

In operation 4, by using 4 coefficient values, vector x is obtained. The vector x can be obtained by setting the value t to 4 in equation 11. As a result, by using 120 chromosomes each with a length of 16 bits, 120 vectors x can be generated. The reason why only 4 coefficient values are used here will now be explained. When an eigen vector and eigen value are obtained by using the principal component analysis in the ASM training process, the resulting eigen value becomes the variance of the eigen vector corresponding to the eigen value. Accordingly, by using a small number of eigen vectors, each having large eigen values, an approximate x can be obtained. In order to obtain a more accurate vector x, more eigen vectors can be used.

The 120 random vectors x obtained by performing the operations 1 through 4 as described above are random vectors satisfying the constraints of the ASM, and therefore each x maintains the mean shape. This avoids the possibility that a vector x entirely dissimilar to the face shape is selected as an optimum initial value through the genetic algorithm.

Next, an objective function (f(x)) used to evaluate the appropriateness of the obtained vector (x) can be expressed as the following equation 19:

$$f(x) = \sum_{i=0}^{n-1} (g(x_i, y_i) - \overline{m}_i)^T S_i^{-1} (g(x_i, y_i) - \overline{m}_i). \quad (19)$$

Here, for example, a 3×9 template for a new input image is set, taking $(x_i, y_i)$ as the center of the template, and the normalization process of the equation 16 for the gray level difference value between each pixel included in the 3×9 template and an adjacent pixel is performed. As a result, $g(x_i, y_i)$ is obtained. $\overline{m}_i$ denotes the mean of the 3×9 template used to indicate the statistical feature data for the image structure in the vicinity of an i-th feature point forming the mean shape ($\overline{x}$) provided by the shape model generation unit 210. $S_i^{-1}$ denotes the inverse matrix of the covariance matrix of the 3×9 template used to indicate the statistical feature data for the image structure in the vicinity of the i-th feature point forming the mean shape ($\overline{x}$) provided by the shape model generation unit 210.

Next, by using the 120 vectors (x) and the objective function (f(x)), the genetic algorithm is performed. At this time, the probability of crossover is set to 0.98, and a tournament selection with a size of 7 is determined as a selection mechanism. The convergence condition can be set to a simple frequency, for example, 60 iterations, or can be set as a case where the value of the objective value (f(x)) falls within a predetermined range. This can be performed by inputting 120 vectors (x) and the objective function (f(x)) to the source code of the genetic algorithm program written by Fernando G. Lobo, Georges R. Harik, and David E. Goldberg. The source code is disclosed in detail in an article written by Fernando G. Lobo, Georges R. Harik, and David E. Goldberg entitled "Linkage Learning Genetic Algorithm in C++", IlliGAL Report No. 98006 April 1998.

Each of coordinates of 76 feature points included in a vector (x) finally obtained according to the convergence condition becomes initial positions of feature points adaptively reset depending on the pose of a new face image.

Meanwhile, the genetic algorithm applied to the model-based image interpretation is described in detail in an article by A. Hill and C. J. Taylor entitled "Model-Based Image Interpretation Using Genetic Algorithm" Image and Vision Computing, Vol. 10 No. 5, June 1992, pp 295-300.

Figure 10:
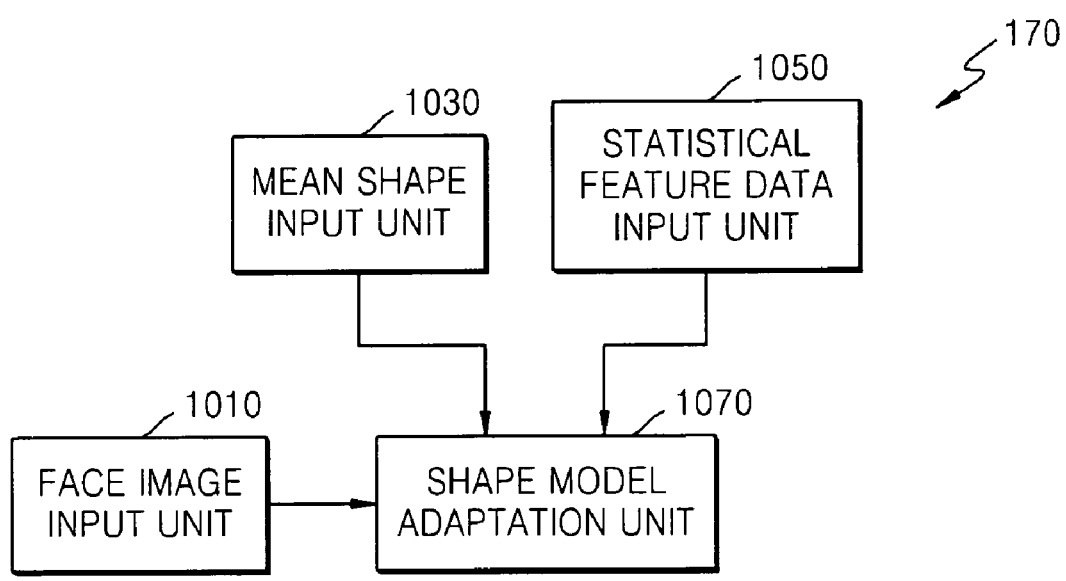
FIG. 10 is a detailed block diagram of a feature point extraction unit in FIG. 1.

FIG. 10 is a detailed block diagram of the feature point extraction unit 170 in FIG. 1. The feature point extraction unit 170 includes a face image input unit 1010, a mean shape input unit 1030, a statistical feature data input unit 1050, and a shape model adaptation unit 1070.

Referring to FIG. 10, the face image input unit 1010 inputs a new face image which has been preprocessed by the preprocessing unit 130 of FIG. 1, in which feature points are searched for.

The mean shape input unit 1030 inputs a mean shape formed with feature points whose initial positions are reset in the initial position resetting unit 150 of FIG. 1.

The statistical feature data input unit 1050 inputs the gray level mean ($\overline{g}$) and gray level covariance ($S_g$) of the main template that is the statistical feature data of each feature point provided by the shape model generation unit 110 of FIG. 1.

By using the statistical feature data of each feature point of the mean shape whose initial position is reset, the shape model adaptation unit 1070 adapts the shape model to the input face image so that feature points of each element of the input face image can be extracted. At this time, the Mahalanobis distance between the gray level mean ($\overline{g}$) and the second sub template ($g_s$) in relation to each feature point is obtained as in the equation 15, and the location of a pixel obtained from the second sub template ($g_s$) having a minimum value under a convergence condition is determined as the final position of the feature point. Here, the second sub template indicates a search unit used for searching the feature points of a new image in a 3×9 main template that is the entire search range for an arbitrary feature point, and is formed, for example, with a size of 3×7. Also in the shape model adaptation process, the gray levels of all pixels included in the main template in relation to each feature point are normalized as in the equation 16.

Though the example of the ASM adaptation process at a single resolution is described above, an ordinary multi-resolution ASM adaptation process can also be applied to embodiments of the present invention.

In the above description, the example of a face image is described, but embodiments of the present invention can also be applied to a joint and bone image included in a medical image.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be a distributed network coupled computer systems so that the computer readable code is stored and executed in a distributed fashion. Also, functional programs, code, and code segments for accomplishing the present invention can be easily construed by programmers skilled in the art to which the present invention pertains.

According to the apparatus and method for generating a shape model of the above-described embodiments of the present invention, in a plurality of training sets for to an object whose feature points are to be extracted, by using a 2-dimensional template as a profile for each feature point of a mean shape, the statistical feature data for the image structure in the vicinity of each feature point is obtained, and by doing so, the possibility of falling into a local minimum when feature points are searched for is greatly reduced.

In addition, according to the apparatus and method for automatically searching for feature points using a shape model according to the above-described embodiments of the present invention, the initial positions of feature points of a shape model obtained from a plurality of training sets and loaded on a new input image are adaptively changed according to the pose of the new input image, and by using a 2-dimensional template as the profile for each feature point, feature points for the contour or the element of an object can be accurately searched for even in an image in which the pose of the object changes greatly.

By searching for the distribution and positions of feature points in a face according to the apparatus and method for automatically searching for feature points, the positions of the elements of a face, that is, the eyebrows, eyes, nose, mouth, and contour of the face, can be accurately found, and as a result, when component-based face recognition is performed, the recognition ratio can be greatly improved. Also, face normalization for 3-dimensional face recognition can be performed by using the feature point search result. In addition, the result of searching for feature points can be used for generating a caricature or an avatar imitating the face of a user.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for searching for feature points of an object, comprising:
a shape model generation unit which generates a shape model including a mean model of an object, and statistical feature data of each feature point forming a mean shape, by training a plurality of training sets in which a plurality of feature points are labeled for the object;
an initial position resetting unit which resets an initial position of each feature point of the mean shape according to a pose of an input image; and
a feature point extraction unit which adapts to the input image the mean shape whose initial position is reset, using the statistical feature data of each feature point of the mean shape, and extracts feature points of the input image.

2. The apparatus of claim 1, wherein the shape model generation unit comprises:
a training database which stores the plurality of training sets in which the plurality of feature points are labeled for the object;
a mean shape generation unit which generates the mean shape of the plurality of training sets; and
a statistical feature data generation unit which generates the statistical feature data for an image structure in a vicinity of a feature point, using a 2-dimensional main template of each feature point forming the mean shape.

3. The apparatus of claim 2, wherein the statistical feature data generation unit normalizes all pixels belonging to the 2-dimensional main template of each feature point, using a gray level mean of an area in which a characteristic of the object is represented.

4. The apparatus of claim 1, wherein, for a plurality of groups formed with a plurality of feature points obtained from the input image, the initial position resetting unit performs a genetic algorithm, using an objective function generated from the statistical feature data of each of the feature points.

5. The apparatus of claim 1, wherein the feature point extraction unit further comprises a shape model adaptation unit which extracts feature points of the input image, by performing a shape model adaptation process in units of 2-dimensional sub-templates in the 2-dimensional main template of each feature point of the mean shape whose initial position is reset on the input image.

6. The apparatus of claim 5, wherein the shape model adaptation unit performs normalization of all pixels belonging to the 2-dimensional main template of each feature point, using a gray level mean of an area in which a characteristic of the input image is represented.

7. A method of searching for feature points of an object, comprising:
generating a shape model including a mean model of an object, and statistical feature data of each feature point forming a mean shape, by training a plurality of training sets in which a plurality of feature points are labeled for the object;
resetting an initial position of each feature point of the mean shape according to a pose of an input image; and
adapting to the input image the mean shape whose initial position is reset, using the statistical feature data of each feature point of the mean shape, and extracting feature points of the input image,
wherein at least one of the generating, the resetting, the adapting, and the extracting is performed by using at least one processing device.

8. The method of claim 7, wherein the generating of the shape model comprises:
providing a training database which stores the plurality of training sets in which the plurality of feature points are labeled for the object;
generating the mean shape of the plurality of training sets; and
generating the statistical feature data for an image structure in a vicinity of a feature point, using a 2-dimensional main template of each feature point forming the mean shape.

9. The method of claim 8, wherein, in the generating the statistical feature data, by using the following equation, all pixels belonging to the 2-dimensional main template of each point are normalized:

$$m_i = \frac{1}{N}\sum_{j=1}^{N} t_{ij}$$

$$\sigma_i^2 = \frac{1}{N}\sum_{j=1}^{N}(t_{ij} - m_i)^2$$

$$t_{ij} \rightarrow \frac{t_{ij} - m_i}{\sigma} \times 128 + 128 + n - m_i, \text{ and}$$

wherein $m_i$ denotes a gray level mean of pixels ($t_{ij}$) belonging to the main template obtained from an i-th feature point, $\sigma_i^2$ denotes a variance between each pixel ($t_{ij}$) and a mean ($m_i$), N denotes a number of samples belonging to the main template, and n denotes a gray level mean of an area in which a characteristic of the input image is represented.

10. The method of claim 7, wherein, in the resetting the initial position, for a plurality of groups formed with a plurality of feature points obtained from the input image, a genetic algorithm is performed by using an objective function generated from the statistical feature data of each of the feature points.

11. The method of claim 10, wherein the objective function is defined by the following equation:

$$f(x) = \sum_{i=0}^{n-1} (g(x_i, y_i) - \overline{m_i})^T S_i^{-1} (g(x_i, y_i) - \overline{m_i}), \text{ and}$$

wherein $g(x_i, y_i)$ denotes a value obtained by setting a main template for an input image while taking ($x_i$, $y_i$) as a center of the template, and then performing a normalization process for a gray level difference value between each pixel included in the main template and an adjacent pixel, $\overline{m_i}$ denotes a mean of the main template in relation to an i-th feature point forming the mean shape ($\overline{x}$), and $S_i^{-1}$ denotes a inverse matrix of a covariance matrix of the main template of the i-th feature point forming the mean shape ($\overline{x}$).

12. The method of claim 7, wherein the extracting the feature points comprises
extracting feature points of the input image, by performing a shape model adaptation process using a 2-dimensional main template of each feature point of the mean shape whose initial position is reset in the input image.

13. The method of claim 12, wherein, in the process for adapting a shape model, by using the following equation, all pixels belonging to the 2-dimensional main template of each point are normalized:

$$m_i = \frac{1}{N} \sum_{j=1}^{N} t_{ij}$$

$$\sigma_i^2 = \frac{1}{N} \sum_{j=1}^{N} (t_{ij} - m_i)^2$$

$$t_{ij} \rightarrow \frac{t_{ij} - m_i}{\sigma} \times 128 + 128 + n - m_i, \text{ and}$$

wherein $m_i$ denotes a gray level mean of pixels ($t_{ij}$) belonging to the main template obtained from an i-th feature point, $\sigma_i^2$ denotes a variance between each pixel ($t_{ij}$) and a mean ($m_i$), N denotes a number of samples belonging to the main template, and n denotes a gray level mean of an area in which a characteristic of the object is represented.

14. A computer readable recording medium having embodied thereon a computer program for executing a method of searching for feature points of an object, the method comprising:
generating a shape model including a mean model of an object, and statistical feature data of each feature point forming a mean shape, by training a plurality of training sets in which a plurality of feature points are labeled for the object;

resetting an initial position of each feature point of the mean shape according to the pose of an input image; and
adapting to the input image the mean shape whose initial position is reset, using the statistical feature data of each feature point of the mean shape, and extracting feature points of the input image.

15. An apparatus for generating a shape model of an object, comprising:
a training database which stores a plurality of training sets in which a plurality of feature points are labeled for an object;
a mean shape generation unit which generates a mean shape of the plurality of training sets; and
a statistical feature data generation unit which generates statistical feature data representing an image structure in a vicinity of a feature point, by applying a 2-dimensional main template to each feature point forming the mean shape, so as to generate the shape model in combination with the mean shape.

16. The apparatus of claim 15, wherein the statistical feature data generation unit normalizes all pixels belonging to the 2-dimensional main template of each feature point, using a gray level mean of an area in which a characteristic of the object is represented.

17. A method of generating a shape model of an object, comprising:
providing a training database which stores a plurality of training sets in which a plurality of feature points are labeled for an object;
generating a mean shape of the plurality of training sets; and
generating statistical feature data representing an image structure in a vicinity of a feature point, by applying a 2-dimensional main template to each feature point forming the mean shape, so as to generate the shape model in combination with the mean shape,
wherein at least one of the providing of the training database, generating the mean shape, and generating the statistical feature data is performed by using at least one processing device.

18. The method of claim 17, wherein, in the generating the statistical feature data, by using the following equation, all pixels belonging to the 2-dimensional main template of each point are normalized:

$$m_i \frac{1}{N} \sum_{j=1}^{N} t_{ij}$$

$$\sigma_i^2 = \frac{1}{N} \sum_{j=1}^{N} (t_{ij} - m_i)^2, \text{ and}$$

$$t_{ij} \rightarrow \frac{t_{ij} - m_i}{\sigma} \times 128 + 128 + n - m_i$$

wherein $m_i$ denotes a gray level mean of pixels ($t_{ij}$) belonging to the main template obtained from an i-th feature point, $\sigma_i^2$ denotes a variance between each pixel ($t_{ij}$) and a mean ($m_i$), N denotes a number of samples belonging to the main template, and n denotes a gray level mean of an area in which a characteristic of the input image is represented.

19. A computer readable recording medium having embodied thereon a computer program for executing a method of generating a shape model of an object, wherein the method comprises:
  providing a training database which stores a plurality of training sets in which a plurality of feature points are labeled for an object;
  generating a mean shape of the plurality of training sets; and
  generating statistical feature data representing an image structure in a vicinity of a feature point, by applying a 2-dimensional main template of each feature point of the mean shape, so as to generate the shape model in combination with the mean shape.

* * * * *

UNITED STATES PATENT AND TRADEMARK OFFICE
CERTIFICATE OF CORRECTION

PATENT NO. : 7,711,156 B2
APPLICATION NO. : 11/365688
DATED : May 4, 2010
INVENTOR(S) : Whoiyul Kim et al.

Page 1 of 1

It is certified that error appears in the above-identified patent and that said Letters Patent is hereby corrected as shown below:

Column 14, Line 60-61, change "$\sigma_i^2 = \frac{1}{N}\sum_{j=1}^{N}(t_{ij} - m_i)^2$" to --$\sigma_i^2 = \frac{1}{N}\sum_{j=1}^{N}(t_{ij} - m_i)^2$, and--.

Column 14, Line 62-64, change "$t_{ij} \rightarrow \frac{t_{ij} - m_i}{\sigma} \times 128 + 128 + n - m_i$, and" to --$t_{ij} \rightarrow \frac{t_{ij} - m_i}{\sigma} \times 128 + 128 + n - m_i$--.

Column 15, Line 31, change "comprises" to --comprises:--.

Column 15, Line 45-47, change "$\sigma_i^2 = \frac{1}{N}\sum_{j=1}^{N}(t_{ij} - m_i)^2$" to --$\sigma_i^2 = \frac{1}{N}\sum_{j=1}^{N}(t_{ij} - m_i)^2$, and--.

Column 15, Line 48-50, change "$t_{ij} \rightarrow \frac{t_{ij} - m_i}{\sigma} \times 128 + 128 + n - m_i$, and" to --$t_{ij} \rightarrow \frac{t_{ij} - m_i}{\sigma} \times 128 + 128 + n - m_i$--.

Column 16, Line 50-51, change "$m_i \frac{1}{N}\sum_{j=1}^{N} t_{ij}$" to --$m_i = \frac{1}{N}\sum_{j=1}^{N} t_{ij}$--.

Signed and Sealed this
Twelfth Day of June, 2012

David J. Kappos
*Director of the United States Patent and Trademark Office*